(12) United States Patent
Detwiler

(10) Patent No.: US 9,710,684 B2
(45) Date of Patent: Jul. 18, 2017

(54) MULTIPLE VIEW SINGLE CAMERA IMAGING SCANNER

(71) Applicant: NCR Corporation, Duluth, GA (US)

(72) Inventor: Paul Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/795,177

(22) Filed: Jul. 9, 2015

(65) Prior Publication Data

US 2017/0011242 A1    Jan. 12, 2017

(51) Int. Cl.
*G02B 26/00* (2006.01)
*G06K 7/10* (2006.01)
*G02B 26/10* (2006.01)
*H04N 5/225* (2006.01)

(52) U.S. Cl.
CPC ....... *G06K 7/10623* (2013.01); *G02B 26/105* (2013.01); *G06K 7/1096* (2013.01); *G06K 7/10613* (2013.01); *G06K 7/10722* (2013.01); *H04N 5/2252* (2013.01); *H04N 5/2254* (2013.01)

(58) Field of Classification Search
CPC ........... G06K 7/10702; G06K 7/10861; G06K 7/10722; G06K 7/10613; G06K 7/10732; G06K 7/10693; G06K 7/10712; G06K 7/10574; G06K 7/10623; G02B 26/12; G02B 26/10; G02B 26/0841; G02B 26/085; G02B 26/101; G02B 26/105; H04N 5/74; H04N 9/3129; H04N 13/044; H04N 13/0468
See application file for complete search history.

(56) References Cited

U.S. PATENT DOCUMENTS

| | | | | |
|---|---|---|---|---|
| 4,953,036 A * | 8/1990 | Yoshimura | ......... | G06K 15/1204 358/400 |
| 6,045,045 A * | 4/2000 | Detwiler | ............ | G06K 7/10702 235/462.35 |
| 2008/0135619 A1 | 6/2008 | Kwan | | |
| 2009/0206161 A1* | 8/2009 | Olmstead | ........... | G06K 7/10702 235/462.41 |
| 2010/0155484 A1* | 6/2010 | Gregerson | ............. | G02B 26/12 235/462.41 |
| 2012/0118963 A1* | 5/2012 | Drzymala | .......... | G06K 7/10722 235/454 |

* cited by examiner

*Primary Examiner* — Thien T Mai
(74) *Attorney, Agent, or Firm* — Schwegman, Lundberg & Woessner

(57) ABSTRACT

An imaging system includes a camera having a field of view, a set of axially spaced moveable mirrors supported on a rotor to rotate the mirrors within the field of view of the camera, and a set of stationary mirrors supported to redirect the fields of view from the set of moveable mirrors to provide multiple fields of view at different angles.

17 Claims, 13 Drawing Sheets

|  | ANGEL TO FACET CENTER (°) | TIME TO FACET CENTER (ms) | NOMINAL EXPOSURE TIME (ms) | TRAVEL EXPOSURE (°) |
|---|---|---|---|---|
| GAP (4) | 0 | 0 | 0.12 | 0.432 |
| M1 | 90 | 25 | 0.12 | 0.432 |
| M2 | 180 | 50 | 0.12 | 0.432 |
| M3 | 270 | 75 | 0.12 | 0.432 |
| PULSE | 0 | 0 | 0.12 | 34.41 |

*FIG. 3*

MULTIPLE VIEW SINGLE CAMERA IMAGING SCANNER

BACKGROUND

Laser based barcode scanners have been in operation for years. In order for image based scanners to supplant laser based barcode scanners, multiple fields of view may be needed to capture images of a barcode, which may be located on various surfaces of a product as the product is moved across one or more scanning windows.

SUMMARY

An imaging system includes a camera having a field of view, a set of axially spaced moveable mirrors supported on a rotor to rotate the mirrors within the field of view of the camera, and a set of stationary mirrors supported to redirect the fields of view from the set of moveable mirrors to provide multiple fields of view at different angles.

A further example scanner includes a scanner housing having a horizontal scanning window and a vertical scanning window, a camera supported within the scanner housing, the camera having a field of view with an axis extending vertically, a set of axially spaced mirrors supported on a rotor normal to an axis of rotation of the rotor, the axis of rotation of the rotor being angled from the field of view axis to rotate the mirrors within the field of view of the camera, and multiple sets of stationary mirrors, each set supported to redirect the fields of view from a respective mirror of the set of mirrors supported on the rotor to provide multiple fields of view at different angles.

A method includes rotating a set of mirrors alternately into a field of view of a camera, reflecting the field of view from each mirror via multiple further mirrors to provide multiple fields of view through a scanner window to project images of produce barcodes passing by the scanner window at different angles and capturing images of the barcodes from the multiple fields of view.

BRIEF DESCRIPTION OF THE DRAWINGS

FIG. 3 is a table illustrating a timing summary for rotor mirrors and a gap, and camera exposure time according to an example embodiment.

DETAILED DESCRIPTION

Figure 1:
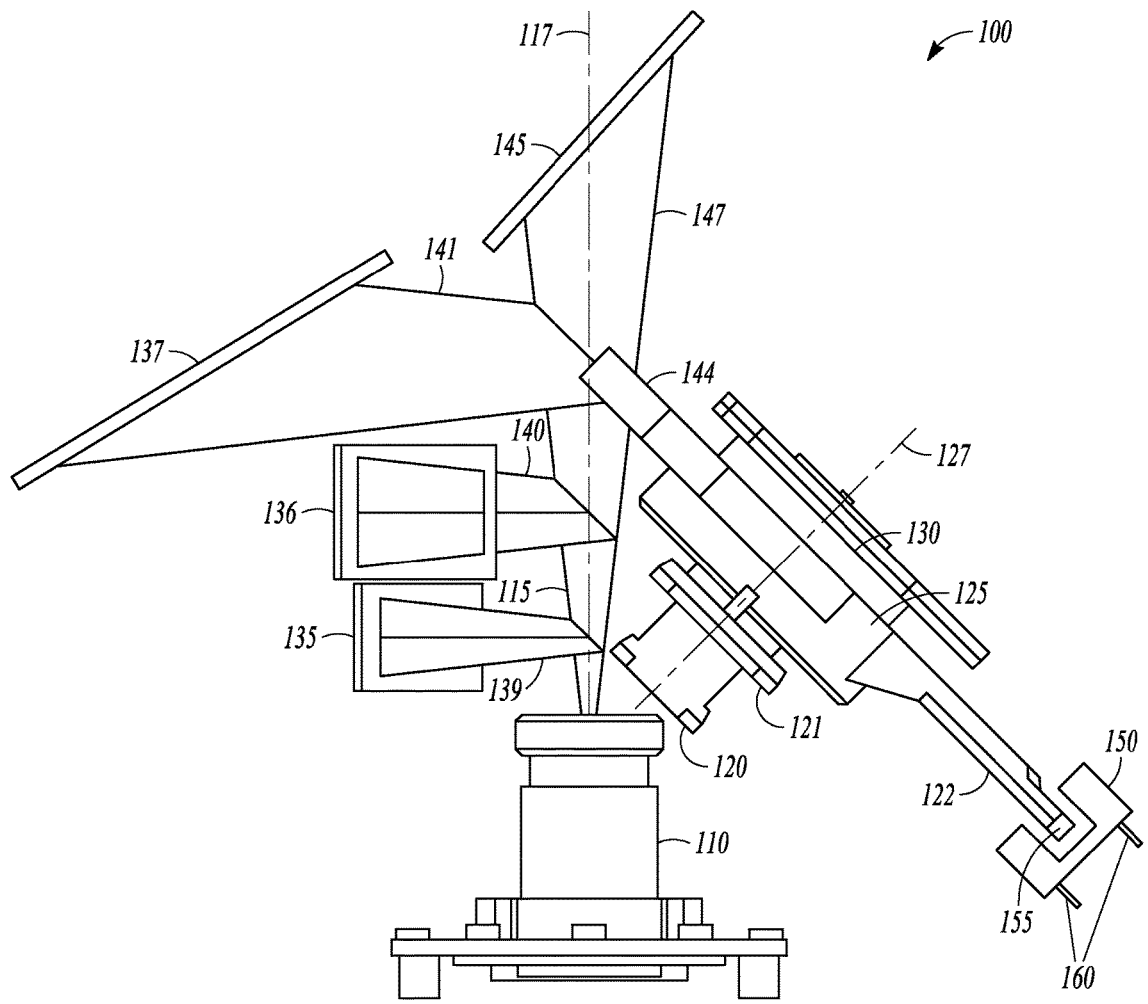
FIG. 1 is a block diagram of a rotor that rotates multiple mirrors into a field of view of a camera to facilitate generation of multiple fields of view for a scanner according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on one or more non-transitory storage devices. Examples of such non-transitory storage devices include computer readable media or computer readable storage devices such as one or more memory or other type of hardware based storage devices, either local or networked and other non-transitory storage devices. The term "module" may be used to represent code stored on a storage device for execution by circuitry, such as one or more processors, which together form specifically programmed circuitry or computer. Modules may also include combinations of code, circuitry, firmware or any combination thereof capable of performing functions associated with the module. Multiple functions may be performed in one or more modules as desired, and the embodiments described are merely examples. The code or software may be executed on a digital signal processor, ASIC, microprocessor, or other type of processor operating on a computer system, such as a personal computer, server or other computer system.

A scanner having one or more windows providing a scan zone for use by a checker, uses spatial mirror switching and splitting of a single camera field of view into multiple scan window fields of view having different angles. The multiple fields of view provide omni-directional coverage of items passed through the scan zone, which may include a horizontal facing and a vertical facing window. The scanner comprises a bioptic imaging based scanner that can rival or surpass the performance of laser based systems.

In order for imaging based scanners to supplant laser based barcode scanners in high performance retail applications (such as grocery), a scanned object may be imaged from multiple sides and through multiple apertures. The barcode may include any type of symbol that encodes information such as bar based or QR based codes.

In a two plane (bioptic) scanner, barcodes may be read on the top, bottom, vertical-facing, checker-facing, leading and trailing surfaces of a product being moved within fields of view of the scanning windows. Six orthogonal surfaces imply six fields of view (FOV). If the lead surface FOV emits from the vertical window plane, the image will be skewed in the horizontal direction. Similarly, if the lead surface FOV emits from the horizontal window plane, the image will be skewed in the vertical direction. So, in order to adequately read barcodes on the leading and trailing surfaces, two fields of view may be utilized for each. A total of eight fields of few provides for good imaging performance.

A multiple field of view generator 100 is shown in block diagram form in FIG. 1, a single camera 110 may be used to generate multiple fields of view for scanning barcodes. The camera 110 may be supported inside a scanner housing so that the camera's field of view (FOV) 115, along an optical axis 117 generally extending in a vertical upward direction, is reflected from one of several mirrors 120, 121, 122 attached to a spinning rotor 125. The rotor 125 may be rotated about a rotor axis indicated by broken line 127 by a motor 130.

The mirrors 120, 121, and 122 are attached to the rotor to intersect the field of view 115 of the camera 110 as the rotor rotates. The rotor 125 in one embodiment is supported by the housing such that the rotor axis 127 extends away from the optical axis 117 of the camera 110 at an angle of approximately 45 degrees. As each of these mirrors spins into the camera FOV 115, the camera FOV is reflected onto a different stationary mirror as indicated at 135, 136, and 137. The corresponding reflected views are illustrated at 139, 140, and 141 respectively. The camera FOV 115 may also pass through a gap 144 in the rotor 125 and onto another stationary mirror 145.

Stationary mirrors 139, 140, 141, and 145 may be referred to as a first set of stationary mirrors. Various other secondary tertiary and quaternary mirrors or set of mirrors maybe positioned to reflect the field of view from the first set of stationary mirrors one or more times to provide different fields of view extending from the scanning windows. The rotating and stationary sets of mirrors allow the field of view of a single camera 110 to be switched between multiple output fields which can be further reflected to intersect a scanned item from multiple sides through the one or more scanning windows.

The planes of the rotating mirrors 120, 121, and 122 in one embodiment are normal to the axis of rotation 127 so that the incidence angle which is defined as the angle between the axis of rotation 127 and optical axis 117, and the intersection point of the field of view (FOV) and a particular rotating mirror do not change during a reasonable exposure time. The rotating mirrors being normal to the axis of rotation 127 provides an orientation that minimizes inducing blur during exposure of each mirror in the FOV, as would be the case with reflection from rotating mirror that are not so oriented. The term "normal" in one embodiment is not used as an absolute. There may be some deviation from a perfectly normal orientation that results in some blur, but less blur than can be accounted for by image processing circuitry to still recognize a barcode being scanned.

Generator 100 in one embodiment has the rotating mirrors 120, 121, 122 positioned at three different distances from the camera 110 along the axis of rotation 127. As each of these mirrors 120, 121, 122 spin into the field of view 115 at an increasing distance from the camera 110, at least a portion of the camera FOV 115 is directed onto a different stationary mirror 135, 136, 137, and 145 in the case of gap 144. The positioning of the mirrors enables the field of view 115 of a single camera 110 to be switched between four different output fields. Each view from each stationary mirror is then projected onto additional sets of stationary mirrors to provide the different fields of view extending from the scanning windows as further described below and shown in further figures.

Camera 110 in one embodiment is an upward facing camera and lens. In this particular embodiment, the camera 110 is a 1280×960 ⅓" format with a 16 mm lens. This results in a 21° diagonal field of view 115 out of the lens. The motor 130/rotor 125 may be located above the camera with its axis of rotation 127 at a 45° angle to the camera optical axis 117.

Depending upon which rotating mirror 120, 121, and 122 intersects the field of view 115, the field of view will be reflected through 90° at one of three heights to become FOV 1 at 139, FOV 2 at 140 or FOV 3 at 141. FOV 4 indicated at 147, is the special case in which the field of view 115 passes through the gap 144 in the rotor and is undisturbed. The rotor 125 is shown in FIG. 1 in the rotational position that allows the FOV 115 to pass through the gap 144.

In one embodiment, a photo sensor 150 is supported by the housing such that the photo sensor 150 has a beam interrupted once per revolution of the rotor 125 by a blocking fin 155. The blocking fin 155 in one embodiment is located at an outer edge of mirror 122. The photo sensor may generate a signal on pins 160 that may be provided to processing circuitry of the scanner to control the motor speed based on the signal.

Figure 2:
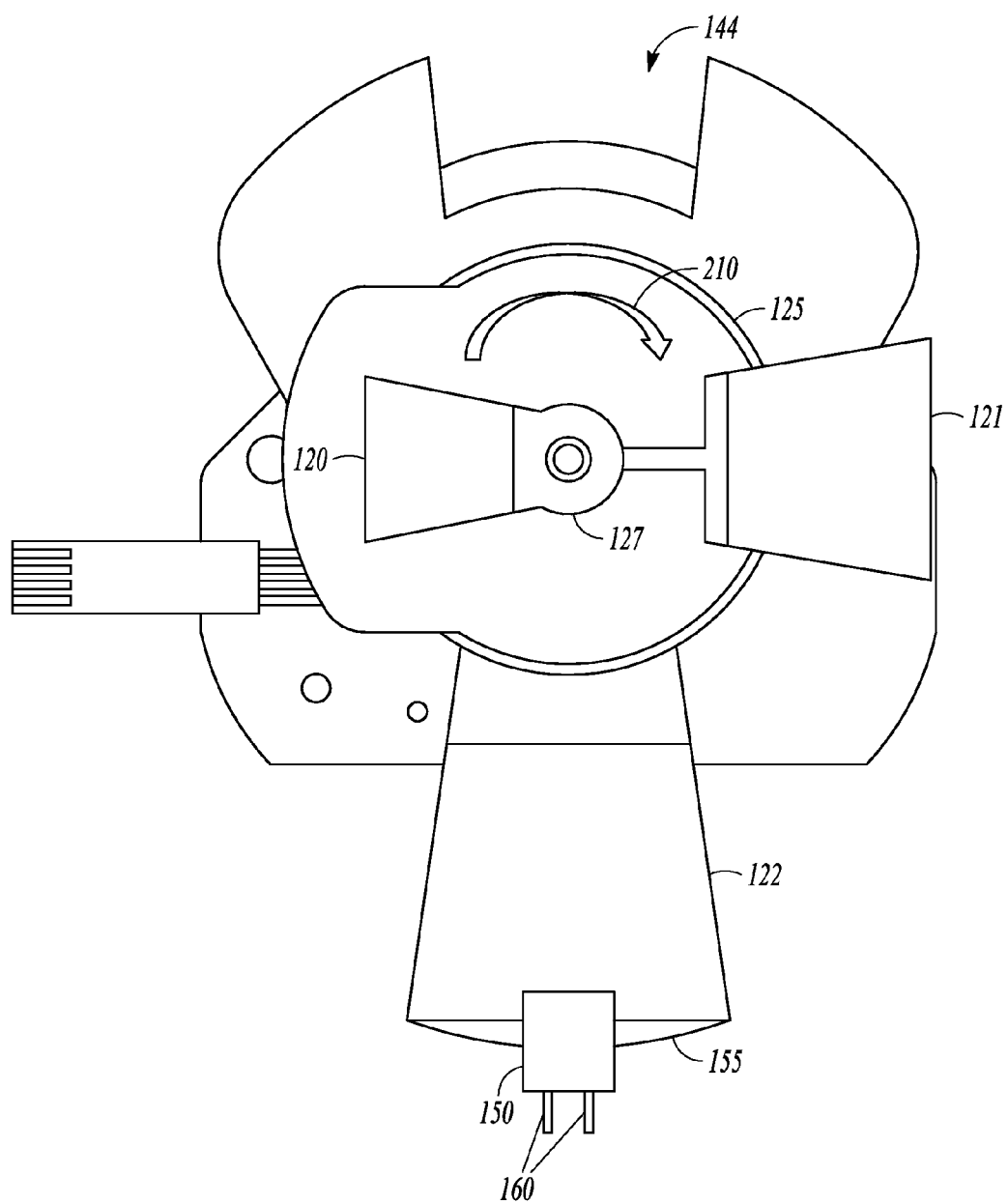
FIG. 2 is a top view of a rotor having multiple mirrors according to an example embodiment.

FIG. 2 is a top view of the rotor 125 showing the three mirrors 120, 121, and 122, and the gap 144 centered at 90° intervals about the rotor axis 127 in one embodiment. Looking down at the motor from the rotor side, the gap 144 is at 12 o'clock, M1 at 120 is at 9 o'clock, M3 at 122 is at 6 o'clock and M2 at 121 is at 3 o'clock. The intervals need not be precisely 90° in some embodiments, as circuitry can accommodate different angles depending on the speed of rotation of the rotor 125, and weight imbalances can be offset with additional mass added to balance the rotor. The mirrors and gap are ordered in increasing (axial) distance from the camera 110 (not angular location). Note that, due to the angle between the camera field of view axis 117 and motor axis 127, the radial distance between the axis 127 and mirror center increases from one mirror to the next. Similarly, as the FOV is increasing with distance from the camera, the mirror (and gap) sizes grow as well.

The rotating mirrors are arranged, and the rotor is designed in one embodiment such that the reflector array (rotor and rotating mirrors) is dynamically balanced. This results in low acoustic noise/vibration and reduced motor bearing wear. The mirrors and the gap are oversized (relative to the nominal field of view) to account for rotor motion during exposure, defocus of the light collected from an object, and mechanical tolerances.

In the particular embodiment shown, the rotor 125 has a clockwise rotation as indicated by arrow 210. The rotor 125 may start in position such that the field of view 115 passes un-reflected through the rotor gap 144 and forms FOV 4 at 147, which strikes stationary mirror 4. The rotor rotates clockwise through a 90° angle and M1 intersects the camera FOV, reflecting it to form FOV 1 which strikes stationary mirror 1. The rotor rotates clockwise through another 90° angle and M3 intersects the camera FOV, reflecting it to form FOV 3, which strikes stationary mirror 3. After another 90° rotation, M2 intersects the camera FOV, reflecting it to form FOV 2, which strikes stationary mirror 2.

The various (primary) stationary mirrors may be arranged so as to reflect the various fields of view onto secondary and tertiary mirror sets such that they emit from one or more scanning windows or apertures and into a scan zone to intersect a scanned item from multiple directions.

The rotation of the rotor may be provided by a DC brushless motor 130 spinning at a fairly constant speed. The exposure of the camera 115 may be synchronized with the angle of the rotor 125 so that exposures occur while the camera is "looking" at a rotating mirror or gap. "Looking" corresponds to the rotating mirror or gap intersecting the camera field of view 115, resulting in an image of a barcode within one of the field of views being captures by an imaging array of the camera 110. The synchronization may be accomplished through the use of the photo-sensor 150. The rotor 125 structure that holds M3 at 122 also serves as the blocking fin 155 for the sensor 150. The sensor 150 may include an emitter and detector separated by a gap through which the fin 155 passes. When the leading edge of this fin 155 passes the center of the sensor 150, the fin 155 blocks the emitted light and is detected by the sensor 150. Once this edge is detected through several rotations, it may be used as a timing trigger by the scanner's circuitry, such as a microprocessor or other controller to control the camera 110 exposure times for all of the mirrors. In general, it is desirable that the each exposure be centered on a particular mirror (M1-M3) 120, 121, and 123 or gap 144.

Another consideration is that the exposures are not instantaneous. The exposure time is a balance between light collection with tolerable illumination levels and blur due to motion of a scanned item. For a pass-by speed of 30-50 inches per second, typical for high throughput grocery applications, a barcode will move 3.5-6 mils (90-150 microns) during a 120 μs exposure. This is acceptable for nominal (13 mil) and somewhat de-magnified labels. For small barcodes, on the order of 5 mils, the operator may scan the item more slowly. As this relates to item motion, it is an issue with all imaging scanners.

One example timing may be provided for a very particular case using a camera with a frame rate of 40 frames per second. As there are four exposures per revolution, this drives a motor speed of 10 rps or 600 rpm. Using a 120 μs exposure, the timings are summarized in table 1 as shown in FIG. 3. Several columns provide values for each of the gap, three rotating mirrors, and a pulse. A first column is the angle to a facet center in degrees. The facet center is 0 at the gap, 90 at mirror 120, 180 at mirror 121 and 270 at mirror 122. A second column provides a time to the facet center in miliseconds (ms) and has corresponding values of 0, 25, 50, 75, and 0. A nominal exposure time is 0.12 ms for each of the gap and rotating mirrors, and is 9.56 ms for the pulse. Finally, a travel during exposure in degrees is provided and is 0.432 ms for each of the gap and rotating mirrors, and is 34.41 ms for the pulse.

For a faster camera, the motor speed would be increased proportionally. Alternatively, the photo-sensor 150 and blocking fin 155 might be replaced by a magnet and Hall-effect sensor to synchronize timing. Or, a stepper motor might be used with or without a timing sensor. The use of a stepper motor would allow the rotor to move to and dwell at a particular exposure position. This would correspond to a low power mode in which only that field was enabled. Any detected motion could be used as a signal to start the motor and resume field switching.

FIGS. 4, 5, 6, and 7 have like elements with identical reference numbers, and are block diagrams illustrating a scanner housing 400 having a horizontal scanning window 410 and a vertical scanning window 415. The generator 100 is located within the scanner housing 400, along with circuitry for processing the images obtained from camera 110 of barcodes appearing in the various fields of view, controlling exposure timing of the camera 110, and controlling the motor 130. Various fields of view from the scanning windows are also illustrated and named corresponding to the position of a barcode on a product that is being moved from a first side 420 of the scanner housing to a second side 425 of the scanner housing as illustrated by an arrow 430. Note that a checker will usually be positioned near an edge 435 of the housing such that the horizontal scanning window 410 is positioned between the vertical scanning window 415 and the checker.

Figure 4:
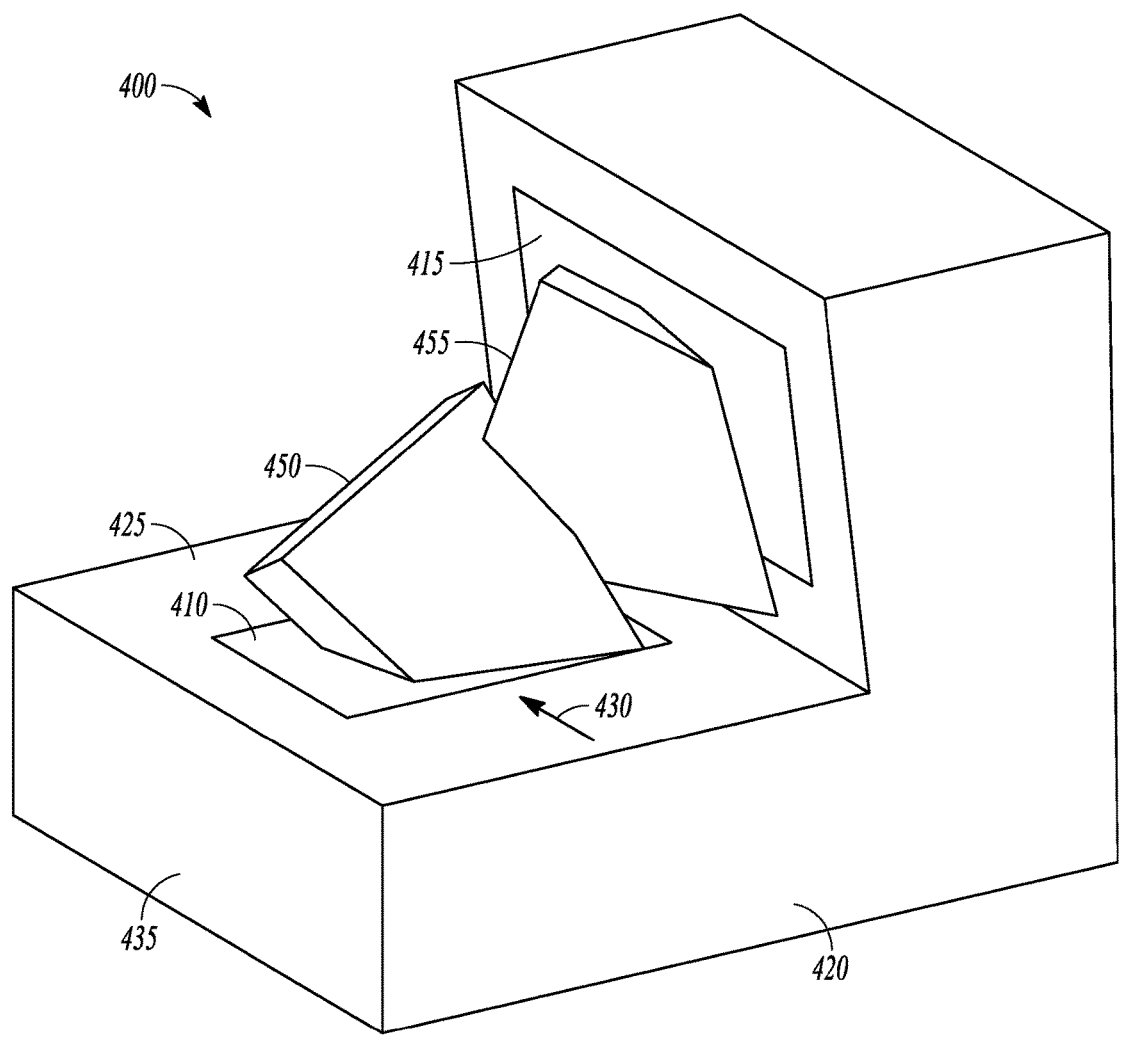
FIG. 4 is a block diagram illustrating a scanner and trail fields of view according to an example embodiment.

FIG. 4 illustrates a trail horizontal field of view 450 that is directed out of the horizontal scanning window toward the left side 425 of the scanner 400. View 450 is designed to capture images of a barcode which are positioned on a trailing edge of a product as the product is moved in the direction of arrow 430. Similarly, a trail vertical field of view 455 is directed out of vertical scanning window 415 and is also angled toward the left side 425 of the scanner 400 to again capture images of a barcode which is positioned on a training edge of the product as the product is moved in the direction of arrow 430.

Figure 5:
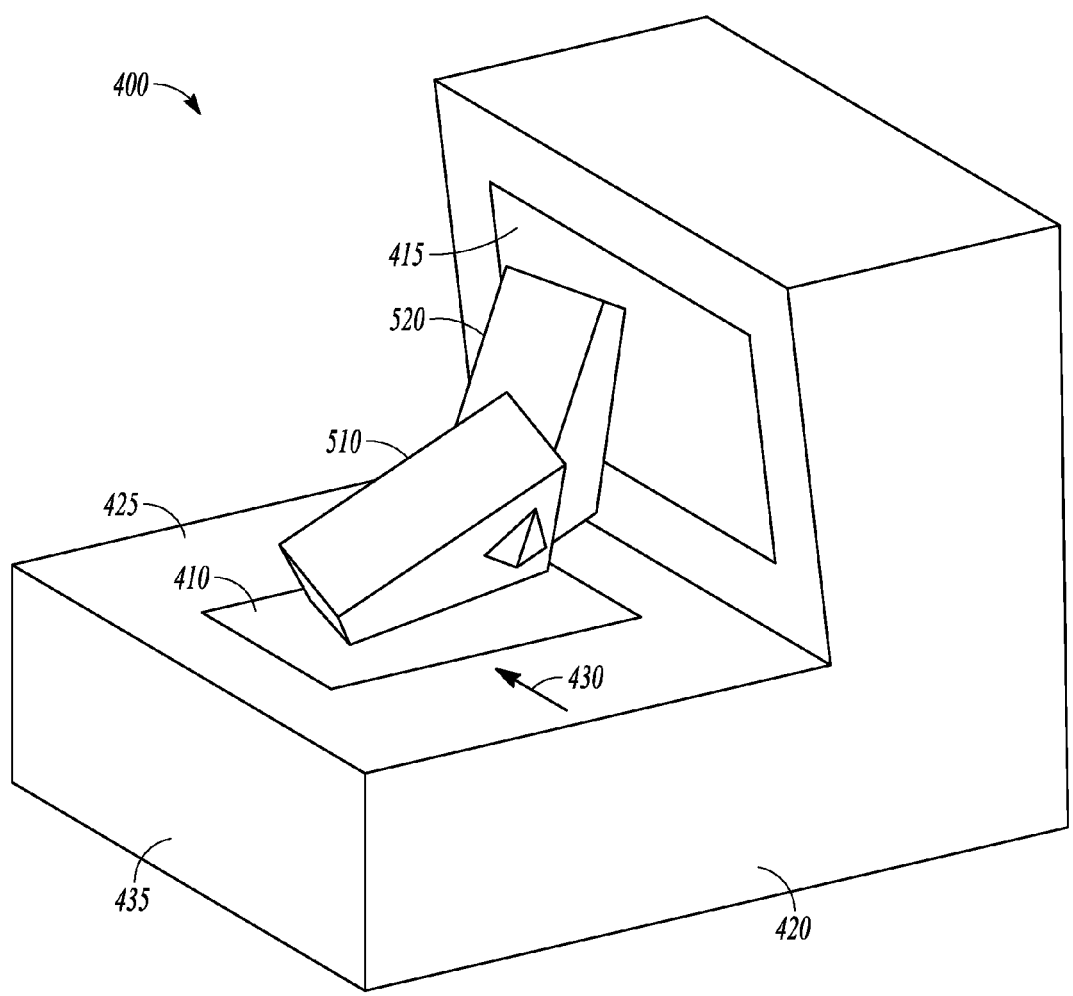
FIG. 5 is a block diagram illustrating a scanner and lead fields of view according to an example embodiment.

FIG. 5 illustrates lead fields of view corresponding to a barcode being on a left side of the product when the product is moved in the direction of arrow 430. In other words, the lead fields of view angle toward side 420 of the scanner housing 400 to obtain a view of the barcode on a leading edge of a product being scanned. A lead horizontal field of view is identified at 510, and a lead vertical field of view is identified at 520, emanating vertically upward from the horizontal scanning window and horizontally toward the checker side 435 of the vertical scanning window respectively.

Figure 6:
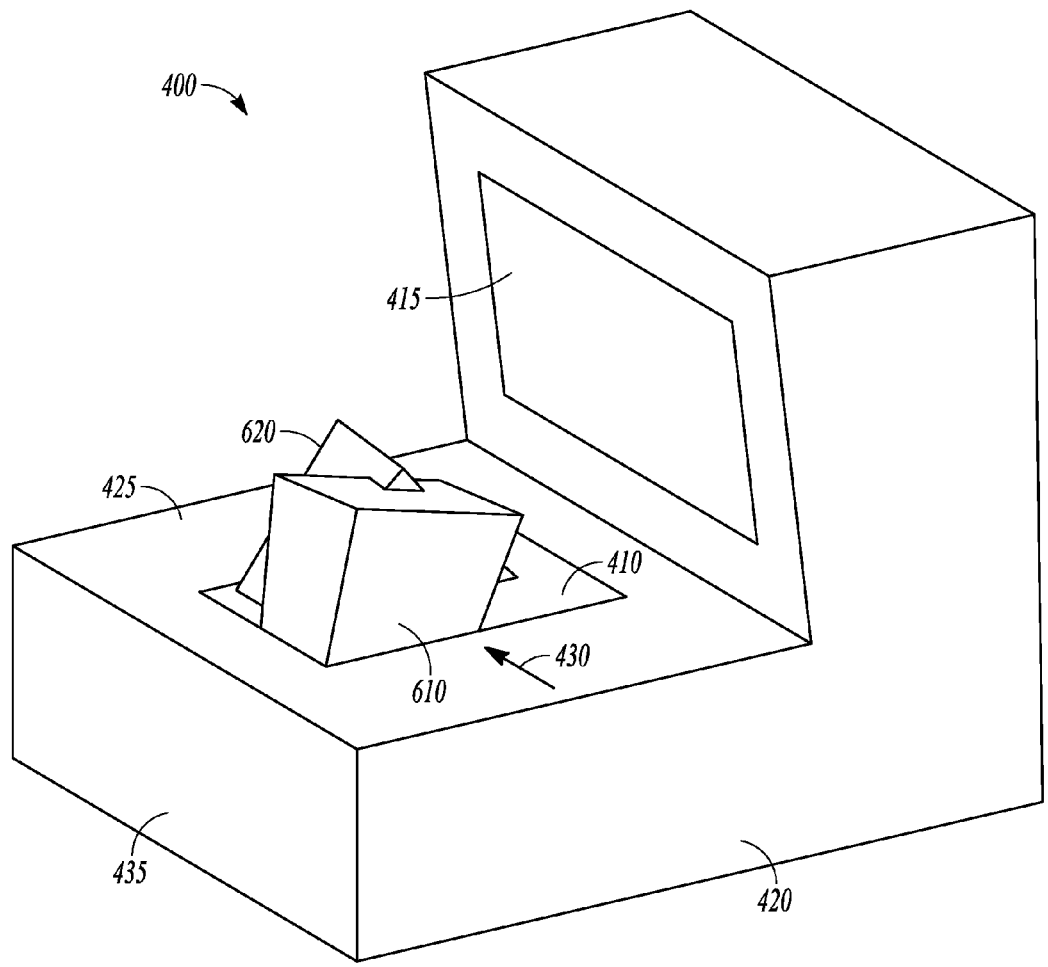
FIG. 6 is a block diagram illustrating a scanner and horizontal fields of view according to an example embodiment.

FIG. 6 illustrates horizontal fields of view corresponding to a barcode being readable from the horizontal scanning window 410. A bottom facing field of view 610 emanates from the horizontal scanning window 410 in a substantially upward direction that may tilt slightly toward the vertical scanning window 415 in some embodiments. The bottom facing field of view 610 may capture images of a barcode on a bottom of a product, in other words, a barcode that is facing the horizontal scanning window 410. A checker side facing field of view 620 also emanates from the horizontal scanning window 410 and is angled more toward the vertical scanning window to obtain images of a barcode that may be facing the checker side 435 of the scanner. The angles of these fields of view may vary from embodiment to embodiment and may be determined empirically or mathematically with little difficulty for different scanners having scanning windows that may deviate from perfectly horizontal and vertical orientations.

Figure 7:
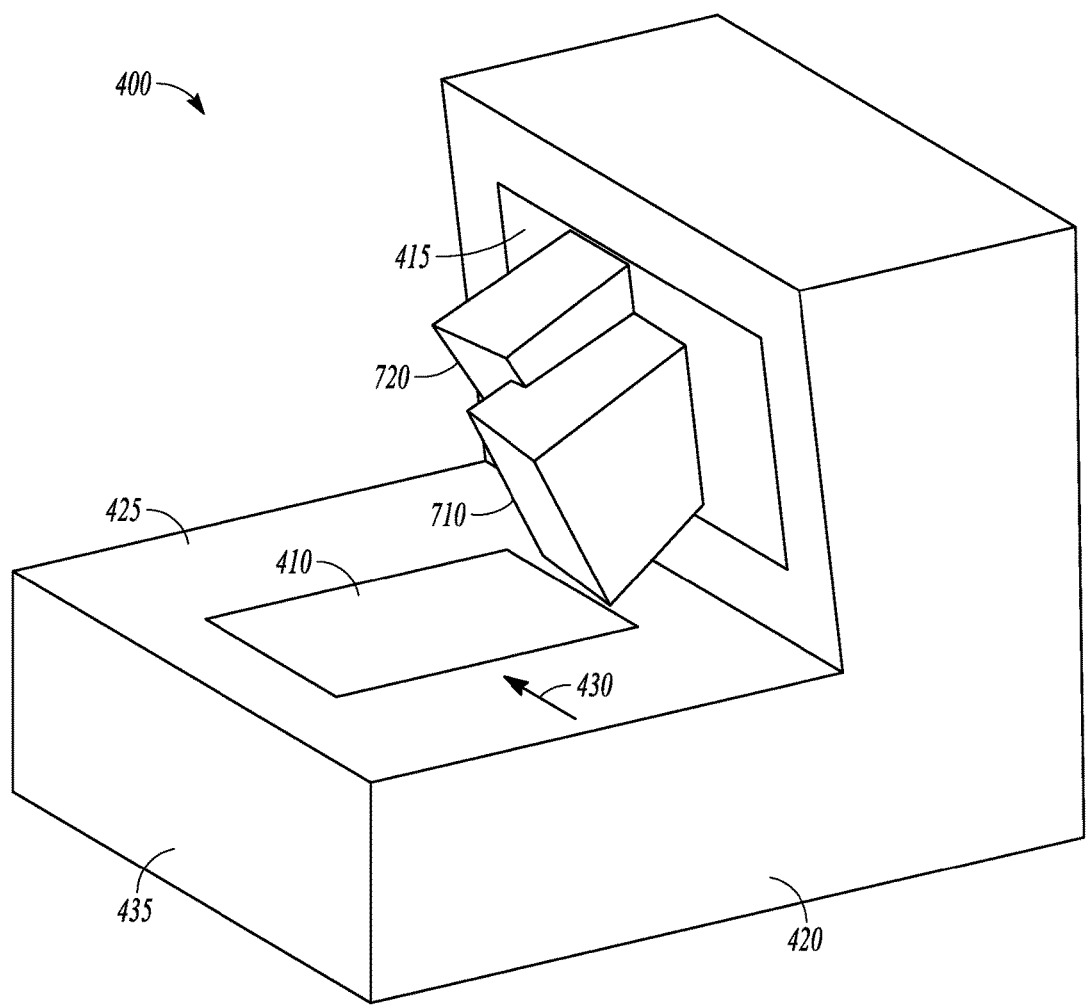
FIG. 7 is a block diagram illustrating a scanner and vertical fields of view according to an example embodiment.

FIG. 7 illustrates vertical fields of view corresponding to a barcode being readable from the vertical scanning window 415. A vertical facing field of view 610 emanates from the vertical scanning window 415 in a substantially outward direction toward the checker side 435 of the scanner housing 400. The vertical facing field of view 610 may tilt slightly downward toward the horizontal scanning window 410 in some embodiments. The vertical facing field of view 710 may capture images of a barcode on a side a product facing the vertical scanning window 415. A top facing field of view 720 also emanates from the vertical scanning window 415 and is angled more toward the horizontal scanning window 410 to obtain images of a barcode that may be facing up on top of a product being scanned. The angles of these fields of view may vary from embodiment to embodiment and may be determined empirically or mathematically with little difficulty for different scanners having scanning windows that may deviate from perfectly horizontal and vertical orientations.

FIGS. 8, 9, 10, and 11 are block diagrams illustrating the positioning of various (primary) stationary mirrors to reflect the various fields of view, corresponding respectively to those illustrated in FIGS. 4, 5, 6, and 7, onto secondary and tertiary mirror sets such that they emit from one or more scanning windows and into a scan zone to intersect a scanned item from multiple directions.

Figure 8:
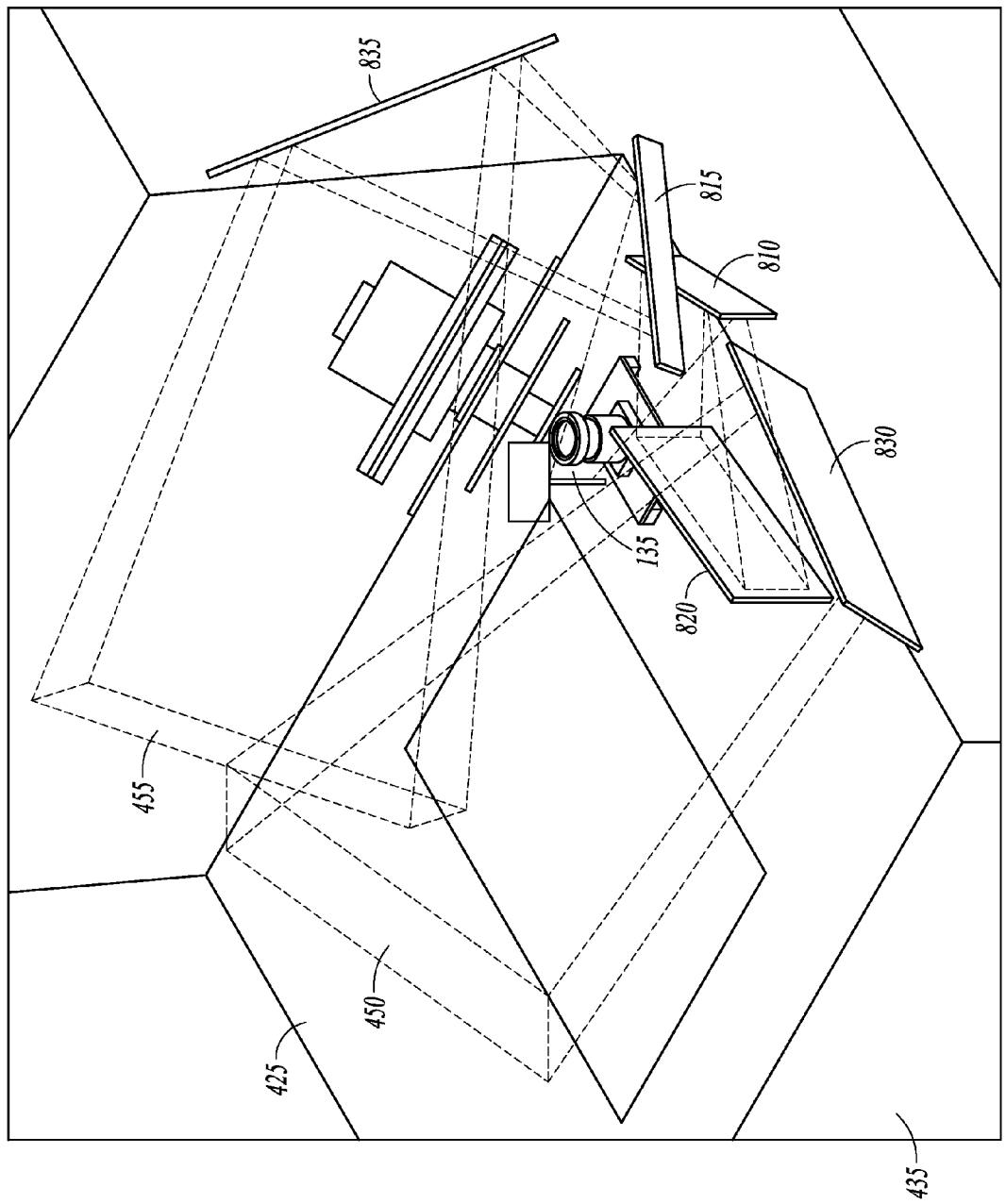
FIG. 8 is a block diagram illustrating the positioning of stationary mirrors in a scanner to reflect fields of view to provide trail fields of view according to an example embodiment.

In FIG. 8, the rotor 125 is positioned such that the first rotating mirror 120 intersects the camera field of view 115 and reflects it toward stationary mirror 135. The Stationary mirror 135 is angled to reflect the field of view 139 toward a split secondary mirror 810, 815 which are horizontally split in one embodiment, and positioned towards the side 420 of the scanner housing below the horizontal scanning window.

The split secondary mirror divides the field of view into two parts, with mirror 810 directing the field of view toward a horizontal tertiary mirror 820 positioned partially toward the side 425 of the scanner housing to direct the field of view toward a horizontal quaternary mirror 830 positioned back toward side 430, which then provides the trailing horizontal field of view 450 through the horizontal scanning window.

At the same time, the mirror 815 of the split mirror is angled partially upward to direct the other portion of the field of view 139 toward a vertical tertiary mirror 835 located behind the vertical imaging window and positioned to provide the trail vertical field of view 455. Note that the fields of view 450 and 455 are provided at the same time from the field of view 139 that is split by mirrors 810 and 815 and further sets of mirrors. The mirrors are positioned such that the respective fields of view emanate from the horizontal and vertical scanning windows at the same time with little overlap. Images captured within such fields of view may be captures by the camera in different portions of an imaging array and processed to identify information in the barcodes in such captured images. Together, these fields will capture barcodes on the trailing side of a product.

Figure 9:
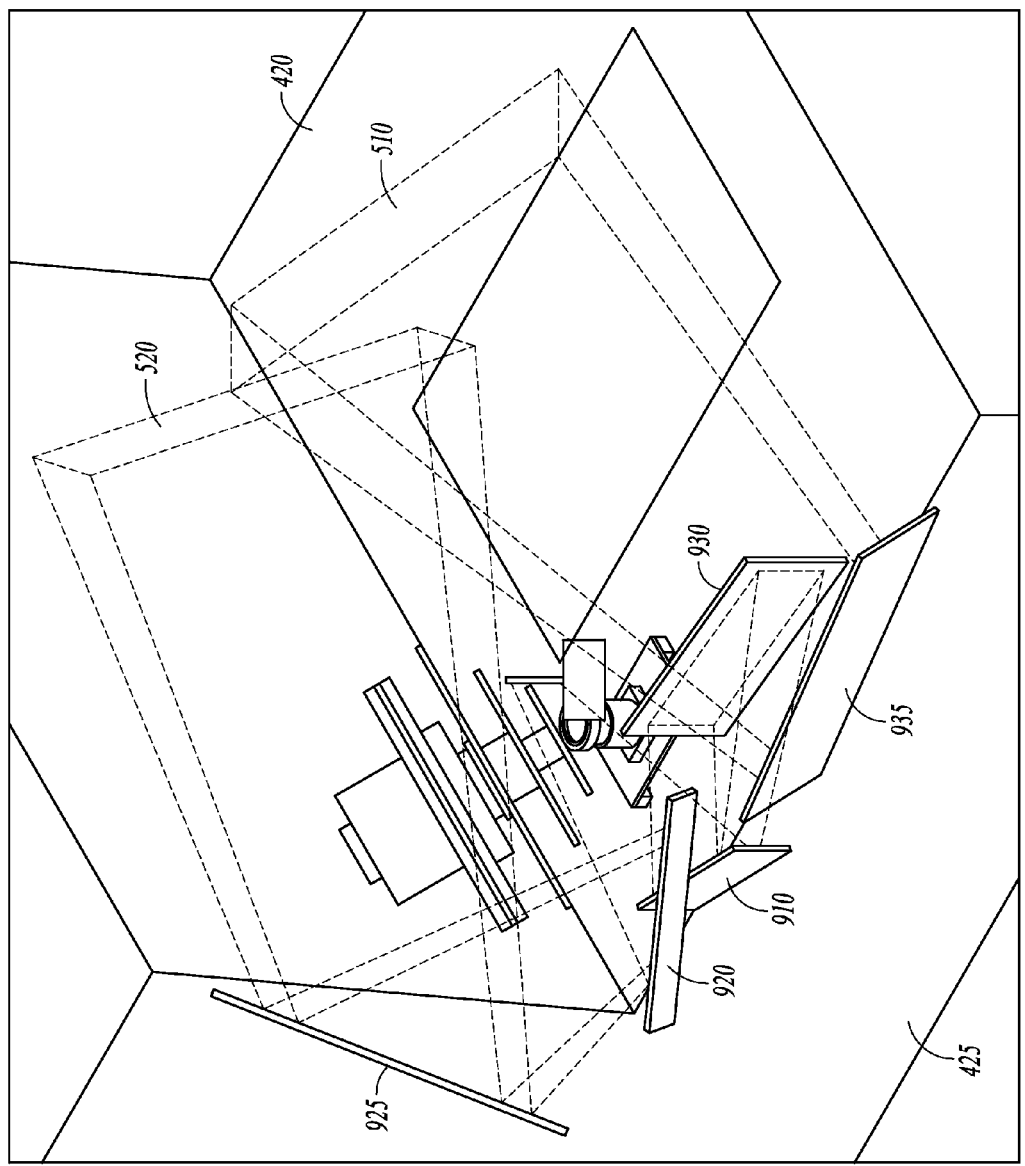
FIG. 9 is a block diagram illustrating the positioning of stationary mirrors in a scanner to reflect fields of view to provide lead fields of view according to an example embodiment.

FIG. 9 illustrates mirror placement to provide the lead fields of view 510 and 520. Field of view 140 provided by rotating mirror 121 is similarly reflected by stationary mirror 136 onto secondary split mirrors indicated at 910 and 920 toward the left side 425 of the scanner housing 400 beneath the horizontal scanning window. A vertical tertiary mirror 925 positioned behind the vertical scanning window and horizontal tertiary and quaternary mirrors 930, 935 positioned beneath the horizontal scanning window respectively emit the split field of view from the scanner vertical and horizontal scanner windows or apertures as lead vertical and horizontal fields of view 520 and 510 respectively. Together, these fields will capture barcodes on the leading side of a product. Note that the horizontal tertiary mirror 930 reflects the field of view back towards the side 425 and towards the horizontal quaternary mirror 935 which is angled to provide the field of view 510.

Figure 10:
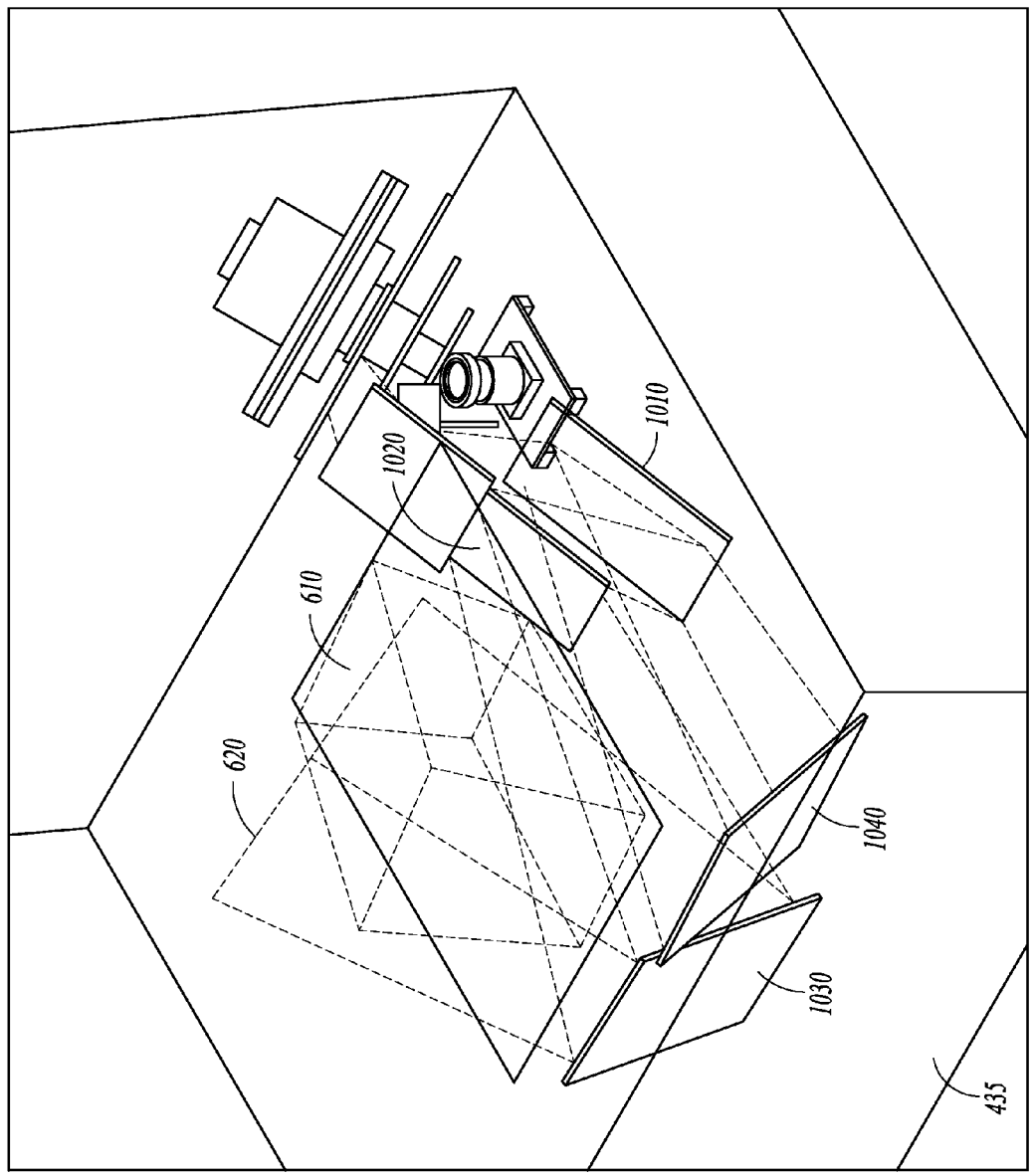
FIG. 10 is a block diagram illustrating the positioning of stationary mirrors in a scanner to reflect fields of view to provide horizontal fields of view according to an example embodiment.

FIG. 10 illustrates mirror placement to provide the horizontal fields of view 610 and 620. Field of view 141 provided by rotating mirror 122 is reflected by stationary mirror 137 onto a pair of secondary split mirrors 1010 and 1020 located below the horizontal scanning window which split the field 141 into a left and right portion, directing such portions toward the checker side 435 of the scanning housing 400. The left portion is reflected by a checker tertiary mirror 1030 to emit from the horizontal aperture in an upward direction and toward the vertical tower as checker side facing field of view 620. Field of view 620 will capture barcodes on the checker facing side of a product. The right portion of the split field is reflected by a bottom tertiary mirror 1040 to emit from the horizontal aperture in an upward direction to capture barcodes on the bottom side of a product via bottom facing field of view 610. Note that the lead and trail horizontal fields may also capture such barcodes. The tertiary mirrors 1030 and 1040 are positioned beneath the horizontal scanning window toward the checker side 435 and are angled upward to provide the respective fields of view.

Figure 11:
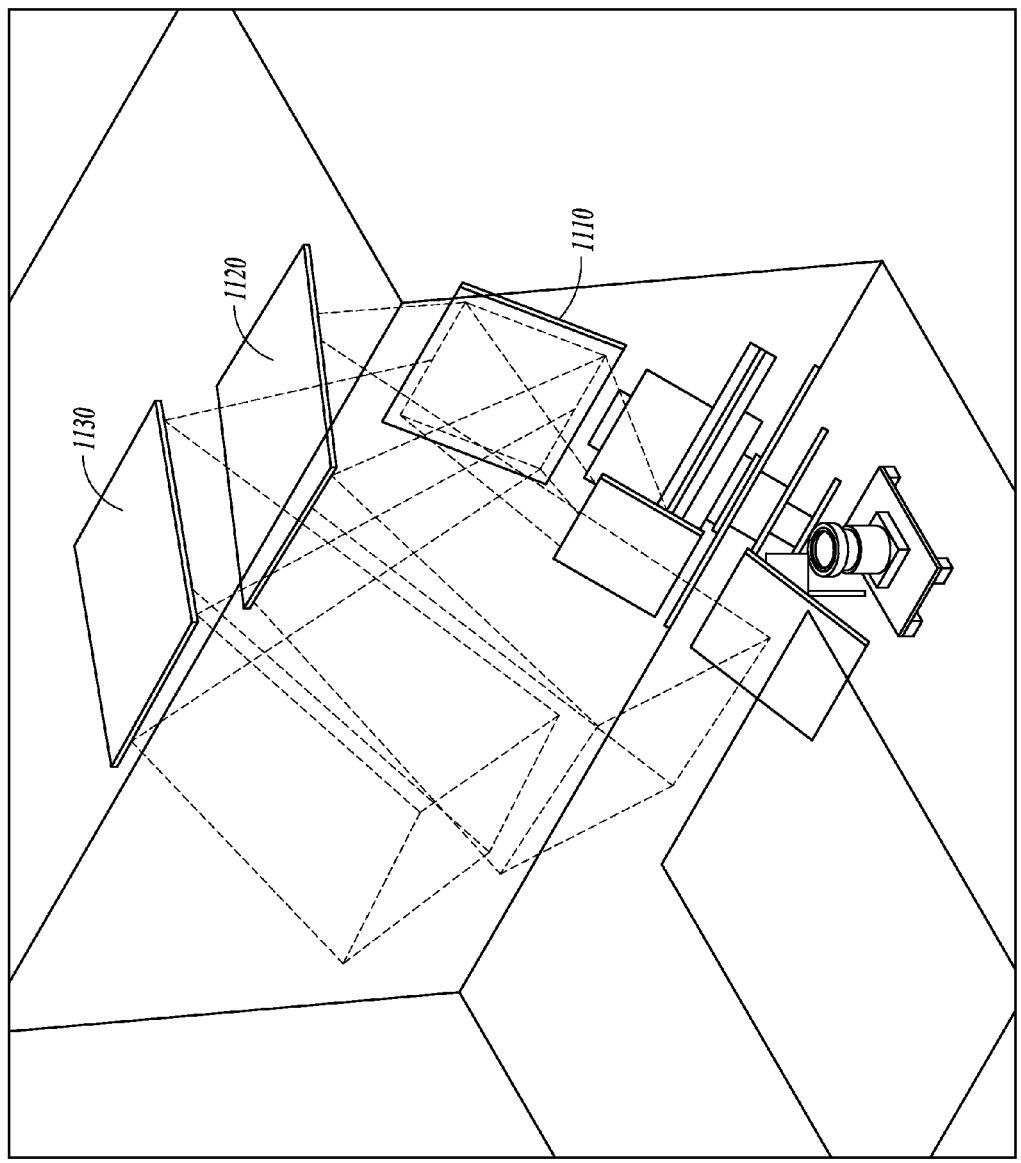
FIG. 11 is a block diagram illustrating the positioning of stationary mirrors in a scanner to reflect fields of view to provide vertical fields of view according to an example embodiment.

FIG. 11 illustrates mirror placement to provide the vertical fields of view 710 and 720. The field of view 147 provided through the gap 144 is reflected by mirror 145 onto a secondary mirror 1110 positioned behind the vertical scanning window. The secondary mirror 110 is angled to reflect the field onto two tertiary mirrors 1120 and 1130, splitting the field into a left and right portion. The left portion is reflected outward and downward from the vertical aperture to capture barcodes on the top side of a product as field of view 720. The right portion is reflected outward from the vertical aperture to capture barcodes on the tower (vertical window supporting) facing side of a product as field of view 710. The lead and trail vertical fields may also capture such barcodes.

Figure 12:
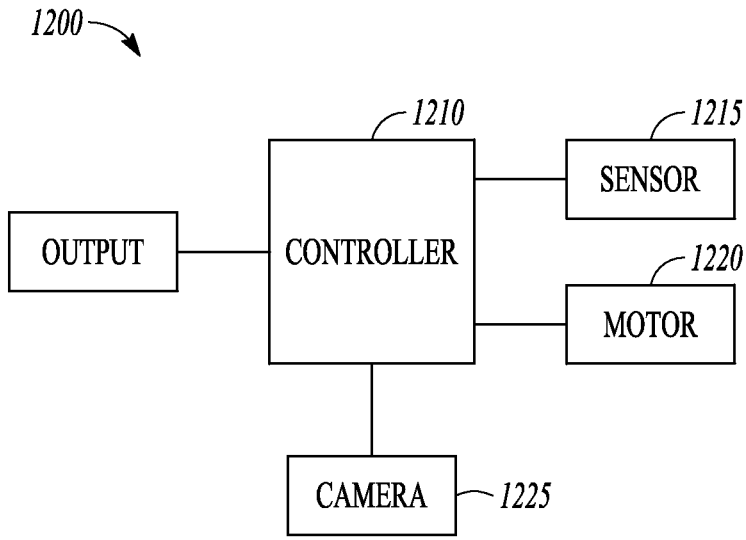
FIG. 12 is a block diagram illustrating scanner electronics according to an example embodiment.

FIG. 12 is a block diagram illustrating electronics 1200 of the scanner in one embodiment. A controller 1210, such as a microprocessor or microcontroller receives sensor input from sensor 1215. Sensor 1215 may provide rotor rotation information to the controller 1210. The controller 1210 uses the information to control the motor 1220 to rotate the rotor and synchronize the rotor speed with the imaging rate of the camera indicated at 1225. The camera 1225 provides imaging data to the controller, which then performs image recognition to extract data from the imaging data which is encoded in the barcodes that have been imaged by the camera. The extracted data is then provided as an output. The output may be used to both generate a list of items being purchased, along with prices. The output may be provided to a central controller via a local network or other network for further processing.

Figure 13:
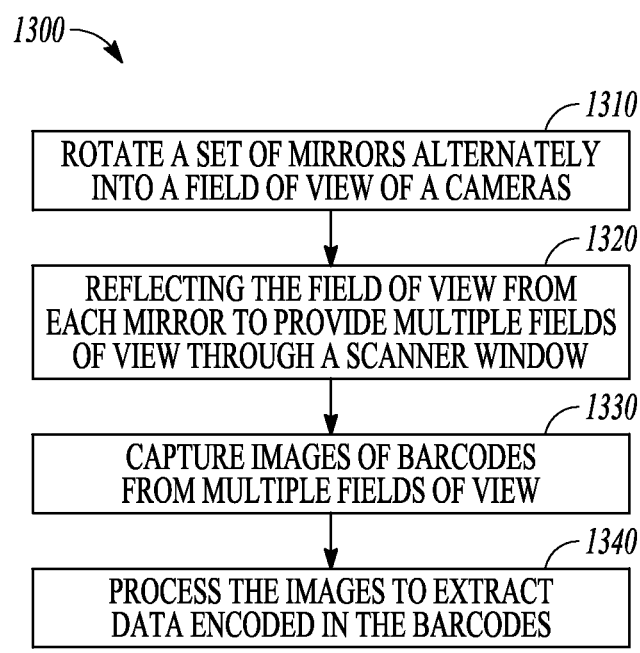
FIG. 13 is a flowchart illustrating a method of scanning barcodes according to an example embodiment.

FIG. 13 is a flowchart illustrating a method 1300 of scanning barcodes. Method 1300 includes rotating a set of mirrors alternately into a field of view of a camera at 1310. At 1320, the field of view from each rotating mirror is reflected via multiple further mirrors to provide multiple fields of view through a scanner window to project images of produce barcodes passing by the scanner window at different angles. At 1330, images of the barcodes are captured from the multiple fields of view. The images may be processed at 1340 to extract data encoded in the barcodes. The extracted data may be processed further by the scanner to generate purchasing transactions or provided to a central controller for further processing in various embodiments.

Figure 14:
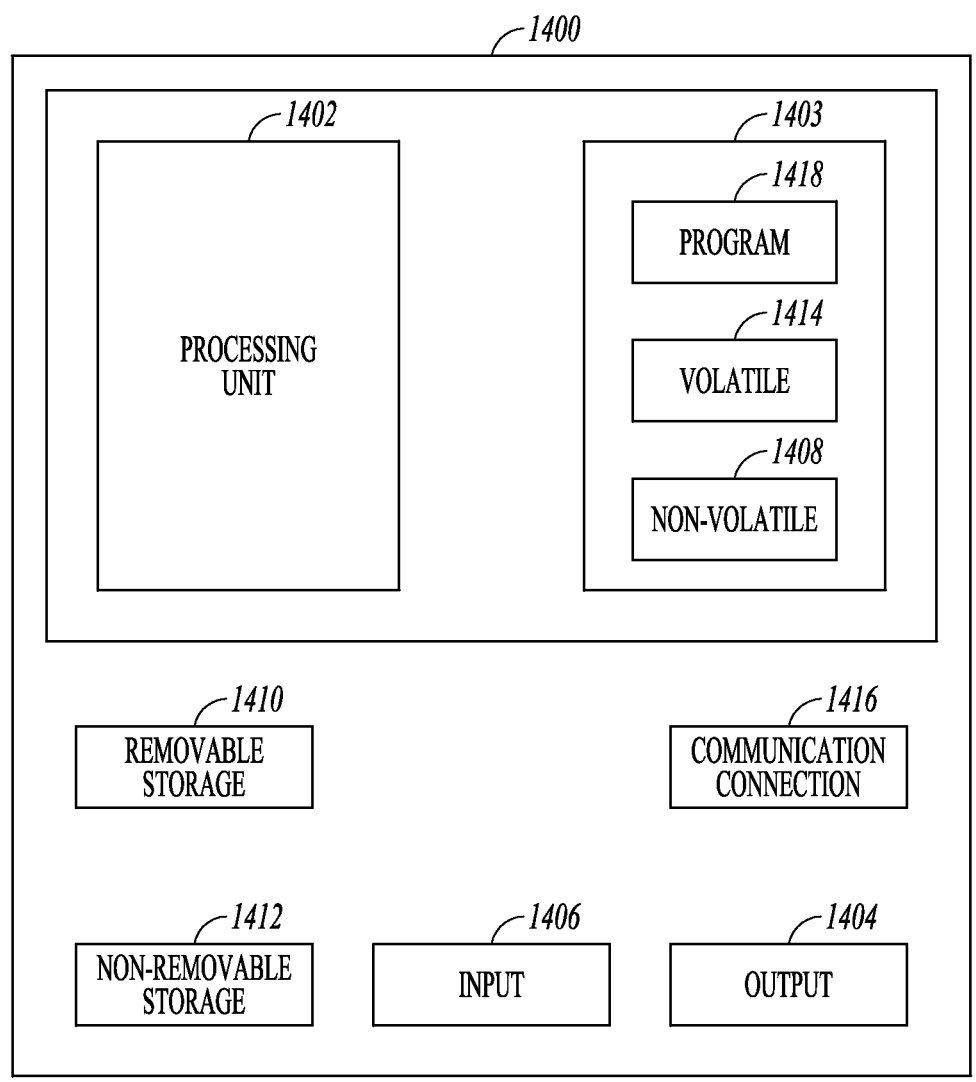
FIG. 14 is a block schematic diagram of a computer system to implement methods according to various example embodiments.

FIG. 14 is a block schematic diagram of a computer system 1400 to implement scanner electronics and methods according to example embodiments. All components need not be used in various embodiments. One example computing device in the form of a computer 1400, may include a processing unit 1402, memory 1403, removable storage 1410, and non-removable storage 1412. Although the example computing device is illustrated and described as computer 1400, the computing device may be in different forms in different embodiments. Although the various data storage elements are illustrated as part of the computer 1400, the storage may also or alternatively include cloud-based storage accessible via a network, such as the Internet.

Memory 1403 may include volatile memory 1414 and non-volatile memory 1408. Computer 1400 may include—or have access to a computing environment that includes—a variety of computer-readable media, such as volatile memory 1414 and non-volatile memory 1408, removable storage 1410 and non-removable storage 1412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 1400 may include or have access to a computing environment that includes input 1406, output 1404, and a communication connection 1416. Output 1404 may include a display device, such as a touchscreen, that also may serve as an input device. The input 1406 may include one or more of a touchscreen, touchpad, mouse, keyboard, camera 110, one or more device-specific buttons, one or more sensors integrated within or coupled via wired or wireless data connections to the computer 1400, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable storage device are executable by the processing unit 1402 of the computer 1400. A hard drive, CD-ROM, and RAM are some examples of articles including a non-transitory computer-readable medium such as a storage device. The terms computer-readable medium and storage device do not include carrier waves. For example, a computer program 1418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1400 to provide generic access controls in a COM based computer network system having multiple users and servers.

EXAMPLES

1. An imaging system comprising:
a camera having a field of view;
a set of axially spaced moveable mirrors supported on a rotor to rotate the mirrors within the field of view of the camera; and
a set of stationary mirrors supported to redirect the fields of view from the set of moveable mirrors to provide multiple fields of view at different angles.

2. The imaging system of example 1 and further comprising:
a housing supporting the camera, the rotor, and the set of stationary mirrors; and a first window supported by the housing, the first window supported to be substantially horizontal when the housing is supported by a floor of a building.

3. The imaging system of example 2 wherein a plurality of the multiple fields of view at different angles provide multiple different angle views of a product proximate the first window outside of the housing.

4. The imaging system of example 3 wherein the multiple different angle views of the product proximate the first window comprise at least two views, each view having a different angle.

5. The imaging system of any of examples 2-4 and further comprising a second window supported by the housing, the second window supported to be substantially vertical when the housing is supported by the floor of the building.

6. The imaging system of example 5 wherein a plurality of the multiple fields of view at different angles provide multiple different angle views of a product proximate the second window outside of the housing.

7. The imaging system of any of examples 5-6 wherein the camera is disposed in the housing such that an optical axis of the field of view of the camera is substantially orthogonal to and extending out of the first window, and wherein the rotor has an axis that is angled approximately 45 degrees from the optical axis of the camera field of view, extending upwards behind the second window.

8. The imaging system of any of examples 6-7 wherein the multiple different angle views of the product proximate the second window comprise at least two views, each view having a different angle.

9. The imaging system of any of examples 1-8 wherein each mirror of set of mirrors supported on the rotor is supported normal to an axis of rotation of the rotor.

10. The imaging system of any of examples 1-9 wherein the rotor further comprises a plate having an opening, the opening corresponding to a direct field of view of the camera, the set of mirrors comprising three mirrors, wherein the three mirrors and the opening are disposed on the rotor approximately 90 degrees from each other.

11. The imaging system of example 10 wherein the size of the mirrors and opening in combination with the speed of the rotor provide fields of view sufficient to obtain an image of a code disposed on a product being scanned.

12. The imaging system of any of examples 1-11 wherein a stationary mirror of the set of stationary mirrors comprises a split mirror to split the field of view into two fields of view.

13. A scanner comprising:
a scanner housing having a horizontal scanning window and a vertical scanning window;
a camera supported within the scanner housing, the camera having a field of view with an axis extending vertically;
a set of axially spaced mirrors supported on a rotor normal to an axis of rotation of the rotor, the axis of rotation of the rotor being angled from the field of view axis to rotate the mirrors within the field of view of the camera; and
multiple sets of stationary mirrors, each set supported to redirect the fields of view from a respective mirror of the set of mirrors supported on the rotor to provide multiple fields of view at different angles.

14. The scanner of example 13 wherein a plurality of the multiple fields of view at different angles provide multiple different angle views of a product proximate the horizontal and vertical scanning windows wherein the multiple different angle views comprise a pair of trail fields of view, a pair of lead fields of view, a pair of horizontal fields of view, and a pair of vertical fields of view.

15. The scanner of example 14 wherein the multiple sets of stationary mirrors include secondary split mirrors, a vertical, horizontal, checker, and bottom tertiary mirrors and horizontal quaternary mirrors.

16. The scanner of any of examples 14-15 and further comprising:
   a motor coupled to rotate the rotor; and
   a controller disposed within the scanner housing coupled to control the motor and the camera to obtain images of barcodes within the multiple fields of view.

17. The scanner of example 16 and further comprising a sensor supported in the scanner housing to detect rotation of the rotor and provide a signal to the controller representative of the speed of rotation of the rotor.

18. A method comprising:
   rotating a set of mirrors alternately into a field of view of a camera;
   reflecting the field of view from each mirror via multiple further mirrors to provide multiple fields of view through a scanner window to project images of produce barcodes passing by the scanner window at different angles; and
   capturing images of the barcodes from the multiple fields of view.

19. The method of example 18 wherein reflecting the field of view from each mirror via multiple further mirrors to provide multiple fields of view comprises providing multiple different angle views of a product proximate a horizontal scanning window and a vertical scanning window, wherein the multiple different angle views comprise a pair of trail fields of view, a pair of lead fields of view, a pair of horizontal fields of view, and a pair of vertical fields of view, and wherein the mirrors are positioned normal to their axis of rotation.

20. The method of any of examples 18-19 and further comprising controlling a motor to rotate the rotating set of mirrors and controlling the camera to obtain images of barcodes within the multiple fields of view.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An imaging system comprising:
   a camera having a field of view;
   a set of axially spaced moveable mirrors supported on a rotor to rotate the mirrors within the field of view of the camera;
   a set of stationary mirrors supported to redirect the fields of view from the set of moveable mirrors to provide multiple fields of view at different angles;
   a housing supporting the camera, the rotor, and the set of stationary mirrors;
   a first window supported by the housing;
   a second window supported by the housing; and
   wherein the camera is disposed in the housing such that an optical axis of the field of view of the camera is substantially orthogonal to and extending out of the first window, and wherein the rotor has an axis that is angled approximately 45 degrees from the optical axis of the camera field of view, extending upwards behind the second window.

2. The imaging system of claim 1 wherein a plurality of the multiple fields of view at different angles provide multiple different angle views of a product proximate the first window outside of the housing.

3. The imaging system of claim 2 wherein the multiple different angle views of the product proximate the first window comprise at least two views, each view having a different angle.

4. The imaging system of claim 1 wherein a plurality of the multiple fields of view at different angles provide multiple different angle views of a product proximate the second window outside of the housing.

5. The imaging system of claim 4 wherein the multiple different angle views of the product proximate the second window comprise at least two views, each view having a different angle.

6. The imaging system of claim 1 wherein each mirror of set of mirrors supported on the rotor is supported normal to an axis of rotation of the rotor.

7. The imaging system of claim 1 wherein the rotor further comprises a plate having an opening, the opening corresponding to a direct field of view of the camera, the set of mirrors comprising three mirrors, wherein the three mirrors and the opening are disposed on the rotor approximately 90 degrees from each other.

8. The imaging system of claim 7 wherein the size of the mirrors and opening in combination with the speed of the rotor provide fields of view sufficient to obtain an image of a code disposed on a product being scanned.

9. The imaging system of claim 1 wherein a stationary mirror of the set of stationary mirrors comprises a split mirror to split the field of view into two fields of view.

10. A scanner comprising:
    a scanner housing having a horizontal scanning window and a vertical scanning window;
    a camera supported within the scanner housing, the camera having a field of view with an axis extending vertically;
    a set of axially spaced mirrors supported on a rotor normal to an axis of rotation of the rotor, the axis of rotation of the rotor being angled from the field of view axis to rotate the mirrors within the field of view of the camera; and
    multiple sets of stationary mirrors, each set supported to redirect the fields of view from a respective mirror of the set of mirrors supported on the rotor to provide multiple fields of view at different angles; and
    wherein the camera is disposed in the housing such that an optical axis of the field of view of the camera is substantially orthogonal to and extending out of the horizontal scanning window, and wherein the rotor has an axis that is angled approximately 45 degrees from the optical axis of the camera field of view, extending upwards behind the vertical scanning window.

11. The scanner of claim 10 wherein a plurality of the multiple fields of view at different angles provide multiple different angle views of a product proximate the horizontal and vertical scanning windows wherein the multiple different angle views comprise a pair of trail fields of view, a pair of lead fields of view, a pair of horizontal fields of view, and a pair of vertical fields of view.

12. The scanner of claim 11 wherein the multiple sets of stationary mirrors include secondary split mirrors, a vertical, horizontal, checker, and bottom tertiary mirrors and horizontal quaternary mirrors.

13. The scanner of claim 11 and further comprising:
    a motor coupled to rotate the rotor; and a controller disposed within the scanner housing coupled to control the motor and the camera to obtain images of barcodes within the multiple fields of view.

14. The scanner of claim 13 and further comprising a sensor supported in the scanner housing to detect rotation of the rotor and provide a signal to the controller representative of the speed of rotation of the rotor.

15. A method comprising:
rotating via a motor, a set of axially spaced moveable mirrors supported on a rotor alternately into a field of view of a camera disposed within a housing;
reflecting the field of view from each mirror via multiple further mirrors to provide multiple fields of view through a first scanner window and a second scanner window disposed within the housing to project images of produce barcodes passing by the scanner window at different angles; and
capturing images of the barcodes from the multiple fields of view via a camera disposed in the housing such that an optical axis of the field of view of the camera is substantially orthogonal to and extending out of the first scanner window and wherein the rotor has an axis that is angled approximately 45 degrees from the optical axis of the camera field of view, extending upwards behind the second scanner window.

16. The method of claim 15 wherein reflecting the field of view from each mirror via multiple further mirrors to provide multiple fields of view comprises providing multiple different angle views of a product proximate the first scanner window and the second scanner window, wherein the multiple different angle views comprise a pair of trail fields of view, a pair of lead fields of view, a pair of horizontal fields of view, and a pair of vertical fields of view, and wherein the mirrors are positioned normal to their axis of rotation.

17. The method of claim 15 and further comprising controlling the motor to rotate the rotating set of mirrors and controlling the camera to obtain images of barcodes within the multiple fields of view.

* * * * *